United States Patent
Gupta et al.

(10) Patent No.: US 11,153,532 B1
(45) Date of Patent: Oct. 19, 2021

(54) CAPTURING AND ORGANIZING TEAM-GENERATED CONTENT INTO A COLLABORATIVE WORK ENVIRONMENT

(71) Applicants: Atlassian Pty Ltd., Sydney (AU); Atlassian Inc., San Francisco, CA (US)

(72) Inventors: Vishesh Gupta, New Delhi (IN); Samartha Vashishtha, Noida (IN)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 17/137,232

(22) Filed: Dec. 29, 2020

(51) Int. Cl.
*H04N 7/15* (2006.01)
*H04L 12/58* (2006.01)
*H04L 29/06* (2006.01)
*G06F 9/54* (2006.01)

(52) U.S. Cl.
CPC ............. *H04N 7/15* (2013.01); *G06F 9/547* (2013.01); *H04L 51/046* (2013.01); *H04L 65/4015* (2013.01)

(58) Field of Classification Search
CPC ...... G06F 9/547; G06F 3/0484; G06F 40/169; G06F 40/253; H04L 47/82; H04L 51/02; H04L 51/046; H04L 51/38; H04L 65/4015; H04L 65/403; H04L 65/80; H04L 67/20; H04L 1/0072; H04L 51/04; H04L 65/4076; H04L 67/02; H04L 67/306; H04N 7/15; G06Q 20/386; G06Q 20/389; G06N 3/006; G06N 5/022; H04W 4/14

USPC ......... 348/14.01, 14.03, 14.05, 14.07, 14.08, 348/14.1; 709/204, 205; 705/7.28
See application file for complete search history.

(56) References Cited

U.S. PATENT DOCUMENTS

| | | | | |
|---|---|---|---|---|
| 5,617,539 | A * | 4/1997 | Ludwig | G06Q 10/10 348/14.03 |
| 5,999,208 | A * | 12/1999 | McNerney | H04N 7/15 348/14.03 |
| 7,185,054 | B1 * | 2/2007 | Ludwig | G06F 3/0482 348/E7.081 |
| 10,423,948 | B1 * | 9/2019 | Wilson | G06Q 20/3255 |
| 10,810,574 | B1 * | 10/2020 | Wilson | G06Q 20/40145 |
| 2005/0062844 | A1 * | 3/2005 | Ferren | H04N 7/142 348/14.08 |
| 2013/0007122 | A1 * | 1/2013 | Su | G06F 40/14 709/204 |

(Continued)

*Primary Examiner* — Gerald Gauthier
(74) *Attorney, Agent, or Firm* — Brownstein Hyatt Farber Schreck, LLP

(57) ABSTRACT

Systems for capturing and organizing team-generated content produced during a meeting defined/facilitated by a third-party meeting tool or service. In particular, a server system includes a memory allocation and a processor allocation configured to cooperate to instantiate an instance of a bridge service configured to communicably couple to API endpoints of the third-party meeting tool and to one or more collaboration tools. The bridge service can monitor user or team input (and/or user input events) to the third-party meeting tool before, during, or after a meeting. Captured user input is provided to an input classifier which classifies the input as one of a set of input types. Based on the input type, parsing or analysis operations can be triggered and/or one or more API endpoints of a collaboration tool is selected such that an input to the collaboration tool, including the user input, can be provided.

20 Claims, 7 Drawing Sheets

(56) References Cited

U.S. PATENT DOCUMENTS

| | | | | |
|---|---|---|---|---|
| 2013/0169733 A1* | 7/2013 | Jang | H04N 21/26275 | 348/14.01 |
| 2013/0197967 A1* | 8/2013 | Pinto | G06Q 10/0637 | 705/7.28 |
| 2014/0176665 A1* | 6/2014 | Gottlieb | H04N 7/15 | 348/14.08 |
| 2014/0184720 A1* | 7/2014 | Dasgupta | H04L 65/4046 | 348/14.1 |
| 2014/0285614 A1* | 9/2014 | Epstein | H04N 7/104 | 348/14.07 |
| 2014/0333713 A1* | 11/2014 | Shoemake | H04L 65/1069 | 348/14.05 |
| 2015/0237303 A1* | 8/2015 | Thapliyal | H04N 7/15 | 348/14.01 |
| 2015/0350258 A1* | 12/2015 | Griffin | H04N 7/15 | 348/14.08 |
| 2016/0246769 A1* | 8/2016 | Screen | G06F 3/0481 | |
| 2016/0294744 A1* | 10/2016 | Zou | H04L 67/306 | |
| 2017/0006160 A1* | 1/2017 | Marya | H04W 4/14 | |
| 2017/0041259 A1* | 2/2017 | Tao | H04L 51/38 | |
| 2017/0099361 A1* | 4/2017 | Digilov | H04W 4/023 | |
| 2018/0007103 A1* | 1/2018 | Levin | H04L 1/0072 | |
| 2018/0063480 A1* | 3/2018 | Luks | H04N 7/152 | |
| 2018/0375806 A1* | 12/2018 | Manning | G06F 16/9566 | |
| 2019/0042988 A1* | 2/2019 | Brown | G06F 16/9535 | |
| 2019/0379712 A1* | 12/2019 | Mota | H04L 65/403 | |
| 2021/0081459 A1* | 3/2021 | Chung | G06F 16/3326 | |

\* cited by examiner

MEETING MINUTES

Title: Planning Meeting Re: #Project
Meeting ID: 123
Date and Time: Jan 01, 2018
Participants: John (phone; 9:00 – 9:14), Jane (video; 9:01 – 9:14), David (video; 9:08 – 9:12)

Recording Link: https://video.url.tld/?id=123
Transcript Link: https://video.url.tld/?id=123&txt=meeting
Chat Link: https://video.url.tld/?id=123&txt=chat
Channel: #Project

Tasks Assigned: @John [Create Project Plan], @Jane [Sync with Project Team], @David [Retrospective]

Pages Edited: #Project (Link)

Files Shared/Referenced/Attached/Discussed: File 1, File 2, File 3

Links Shared/Referenced/Attached/Discussed: Link 1, Link 2, Link 3

Screenshare Snapshots: Snapshot 1 (John), Snapshot 2 (Jane)

Sentiment: John (negative), Jane (neutral), David (positive)

CAPTURING AND ORGANIZING TEAM-GENERATED CONTENT INTO A COLLABORATIVE WORK ENVIRONMENT

TECHNICAL FIELD

Embodiments described herein relate to collaborative work environments and, in particular, to substantially automated systems and methods for aggregating, securely storing, and/or controlling access to information generated, shared, referenced, attached, derived, inferred, or discussed by a team (herein "team-generated content") when operating a third-party meeting service.

More specifically, embodiments described herein relate to systems and methods configured to leverage an application programming interface ("API") endpoint of the third-party meeting service to extract team-generated content during a meeting, select a collaboration tool and an API endpoint thereof based on the team-generated content, and to input the team-generated content and/or metadata thereof to the selected collaboration tool.

BACKGROUND

An organization can establish a collaborative work environment by self-hosting, or providing its employees with access to, one or more platforms or services to facilitate cooperation and completion of work related to common goals. In many cases, a collaborative work environment is defined by multiple purpose-configured collaboration tools (e.g., issue tracking systems, documentation systems, code repository systems, and so on), which may be leveraged by teams to share information.

In addition, teams may use one or more third-party or first-party meeting tools, such as a videoconferencing platform, for meetings. Often, at least one attendee of a meeting is tasked with collecting meeting nodes, memorizing discussion, and generating input to one or more collaboration tools used by the team. In many cases, however, attendees tasked with notetaking are unable to participate in the meeting a meaningful manner while also capturing comprehensive nodes.

SUMMARY

Embodiments described herein take the form of a server system including at least a memory allocation defined by a data store storing an executable asset and a working memory allocation.

The server system includes a processor allocation configured to load the executable asset from the data store into the working memory to instantiate an instance of a bridge service configured to: communicably couple to an application programming interface (API) endpoint of a third-party service; communicably couple to a collaboration tool service; select, from the data store, a user interaction schema associated with the collaboration tool service; receive a user input event from the API endpoint of the third-party service; extract a user input from the user input event; provide the user input as input to an input type classifier; and receive as output from the input type classifier an input type.

In response to determining that the input type is an ignored input type, the bridge service rejects the user input. Alternatively, the bridge service may determine that the input type is a captured input type. In response, the bridge service advances to validate the user input against the user interaction schema and, in response to successful validation of the user input, generate an API request object with the user input and provide the API request object as input to the collaboration tool service.

Certain embodiments described herein take the form of a method of operating an instance of a bridge service configured to parse real-time data from a third-party meeting service as input to a collaboration tool. In many implementations, the method includes the operations of: accessing, by the bridge service, a first application programming interface (API) endpoint of the third-party meeting service during an event defined by the third-party meeting service; receiving an input event from the first API endpoint; obtaining metadata of the event from the third-party meeting service; providing the input event as input to an input classifier; receiving an input type as output from the input classifier; selecting a second API endpoint of the collaboration tool based on the input type; and generating an API request object with the user input, the input type, and the metadata of the event, and providing, by the bridge service, the API request object as input to the second API endpoint of the collaboration tool service.

Certain embodiments described herein take the form of a method of operating a bridge service instance to automatically memorialize information generated when operating a third-party meeting service, the method including the operations of: accessing, by the bridge service, an application programming interface (API) endpoint of the third-party meeting service during an event defined by the third-party meeting service; obtaining event metadata from the third-party meeting service; monitoring, during the event, the API endpoint for user input; on receiving a user input, providing the user input as input to an input classifier to receive an input type; selecting a collaboration tool from a set of collaboration tools based on the input type; and providing, by the bridge service, the user input and the metadata as input to the selected collaboration tool.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 4 depicts an active display area of a client device associated with a collaborative work environment, as described herein, rendering a graphical user interface summarizing team-generated content produced during a meeting or event.

The use of the same or similar reference numerals in different figures indicates similar, related, or identical items.

Figure 1:
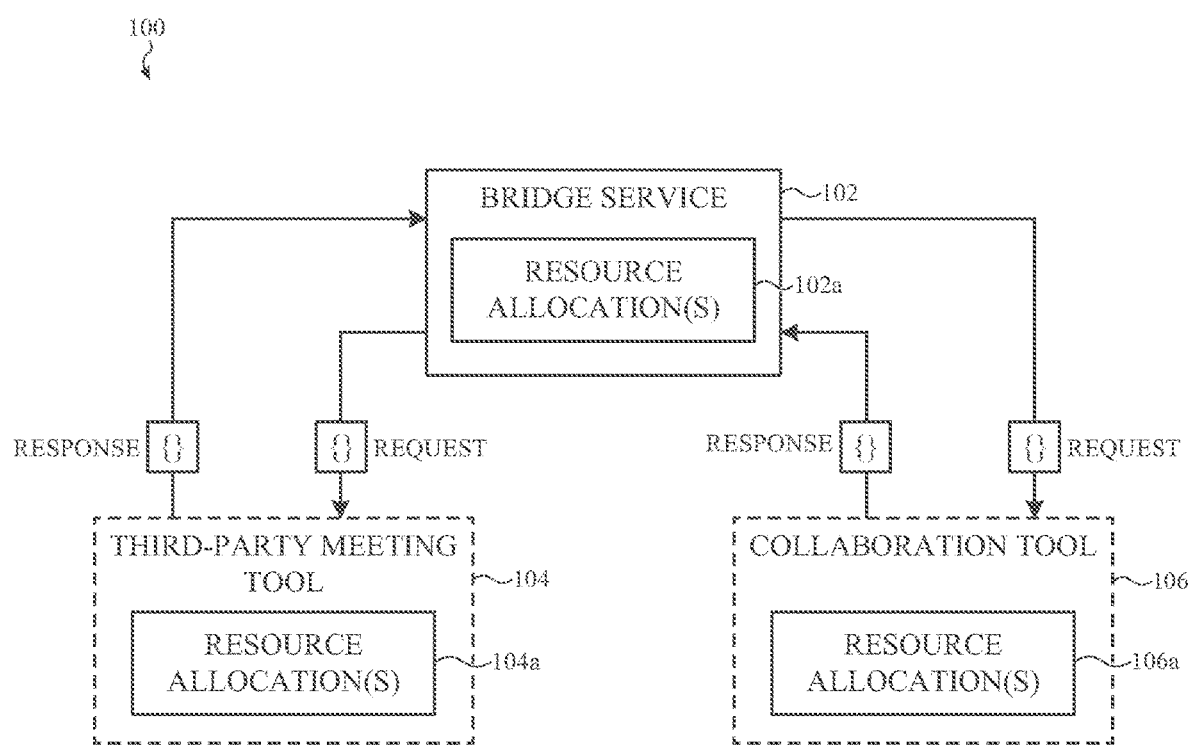
FIG. 1 depicts a collaborative work environment including a third-party meeting tool and a collaboration tool communicably coupled by an instance of a bridge service, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for automatically capturing team-generated content produced, referenced, generated, discussed and so on during a remote meeting.

As used herein, the term "remote meeting" and similar terms including events, occasions, incidents and the like (collectively, "meetings") refer to meetings for which participation of at least one attendee is facilitated, at least in part by communications hardware or software.

More generally, a remote meeting is meeting for which at least one participant is not physically present with other participants, and software or hardware is leveraged by that participant to participate in the meeting. Examples of such software or hardware include but are not limited to: teleconferencing software and hardware; videoconferencing software and hardware; text or multimedia-based chat or discussion platforms; and so on. Collectively, such hardware and/or software tools that may be leveraged to facilitate, at least in part, a remote meeting are referred to herein as "third-party meeting tools" or "third-party meeting services."

For simplicity of description, the embodiments that follow reference a videoconferencing platform as an example third-party meeting tool. However, this is merely one example and may not be required of all implementations of all architectures described herein. Further, although many embodiments that follow reference a third-party meeting tool, it may be appreciated that the systems and methods described herein can equivalently apply to first-party meeting tools as well.

As used herein, the phrase "team-generated content" may be used to refer to any and all content, data, metadata, or other information regardless of form or format that is authored, developed, created, or otherwise added by, edited by, (or otherwise provided for the benefit of), an attendee during a remote meeting. Typically, although not required, team-generated content is input to a collaboration environment defined at least in part by a third-party meeting tool. For example, chat messages added to a chat window of a videoconferencing platform constitute team-generated content as described herein. Similarly, images of a shared screen presented during a video conference facilitated by a videoconferencing platform constitute team-generated content as described herein. More generally, team-generated content can include text information, multimedia information, links to external resources (following a format such as the uniform resource location "URL" format), or any other suitable information or data. For example, in further embodiments, team-generated content can include content spoken (and later, or in real-time, transcribed) during a remote meeting by a participant, content streamed by a participant (e.g., via screen sharing) in the remote meeting, chat logs, and so on.

In some cases, team-generated content that relates to a meeting can include content generated before or after a meeting. For example, a meeting invite circulated to members of a team in advance of a meeting can include information about the meeting, document attachments, links, and so on. Such content is team-generated content as described herein. Further, in some cases, content generated after a meeting, such as in a debriefing meeting or other follow-up meeting can be team-generated content relating to the earlier, original meeting.

In still further examples, team-generated content can include metadata relating to a meeting such as, but not limited to: names of attendees; times at which attendees joined and/or left a meeting; the manner by which an attendee joined a meeting (e.g., video, telephone, and so on); the percentage of time an attendee was on video and/or was muted; the percentage of total participation (e.g., by time, by word count, and so on) attributable to a particular attendee; whether an attendee led a meeting; whether or which attendees shared screens, or documents; sentiment (as determined by sentiment analysis) of an attendee of the meeting; tone and/or inferred emotional state (e.g., frustrated, happy, experiencing stress, and so on) of an attendee of the meeting; and so on.

As may be appreciated, these foregoing examples are not exhaustive; generally and broadly it is appreciated that team-generated content (including metadata describing the same) as described herein can refer to any content, subject, data, or statement regardless of form or format and regardless of source. Any content or metadata related to a meeting constitutes "team-generated content" as described herein.

As noted above, embodiments described herein relate to systems and methods for automatically capturing team-generated content produced, referenced, generated, discussed and so on, during a remote meeting, thereby relieving attendees of the meeting of the task of capturing notes. In other words, as a result of the architectures described herein, all attendees of a remote meeting can fully participate without distracted attention, such as the attention otherwise dedicated to manually capturing meeting nodes, collecting documents and links referenced in the meeting, and/or otherwise memorializing the meeting in one way or another.

More specifically, embodiments described herein relate to systems and methods for aggregating, in real time, team-generated content relating to a meeting conducted over a third-party meeting service and inputting that information, automatically, into one or more collaboration tools of a collaborative work environment.

For example, some embodiments instantiate a bridge service configured to communicably couple an API endpoint of a third-party meeting tool in order to extract therefrom structured data and metadata relating to a particular meeting. Once extracted, the team-generated content can be used to inform a selection of, by the bridge service, a collaboration tool into which the team-generated content should be provided as input.

Example team-generated data that can be obtained by a bridge service as described herein includes but is not limited to: meeting title; invitee list; attendee list; attendee titles; title of meeting invite; date and time of meeting invite; chat logs during the meeting; presenter logs during the meeting; interaction logs (e.g., hand raise, applause, and so on) during the meeting; screenshots taken during a presentation; times attendees signed in or out; transcript of a meeting; video recording of a meeting; and so on.

As noted above, generally and broadly, a bridge service as described herein can be configured to aggregate or otherwise obtain any data, content, or contextualizing information about a meeting and/or the proceedings thereof. In many cases, the bridge service may be configured to present data extracted from a meeting (and/or other team-generated content) in a summary document format that can later be used by attendees of the meeting to refresh a recollection of the meeting and its proceedings.

For example, a summary document generated by a bridge service as described herein can memorialize a meeting title, a meeting location (e.g., identifying a conference room, a particular third-party vendor, and so on), invitees, attendees, and one or more projects or subjects of a meeting. A subject of a meeting can be obtained, in some examples, from a title of a meeting invite circulated to meeting invitees. In other cases, an organizer of the meeting can select one or more topics or subjects of the meeting from a list of possible subjects, topics, or projects for discussion at the meeting.

In yet other examples, the bridge service can be configured to perform a semantic analysis of a transcript of the meeting to ascertain a subject of the meeting. Such constructions may be particularly helpful in a circumstance in which a meeting invite's subject differs from subject matter actually discussed at a particular meeting.

In yet other examples, the bridge service can be configured to determine which portions of a meeting transcript contain the most important or relevant information. For example, in one embodiment, the bridge service is configured to analyze a meeting transcript and to determine word frequency of each word and/or phrase in the document. Thereafter, by utilizing an algorithm such as term frequency, inverse document frequency (TF-IDF), the bridge service may be able to infer which timestamps of a meeting transcript or video call contain the most relevant information. A listing of relevant timestamps can be included in a summary document generated as described above.

In yet further examples, the bridge service can be configured to analyze a transcript, a chat log, or any other text input (e.g., documents linked, documents attached to a meeting invite, and so on) to determine a subject of a meeting. Such information can be included in a summary document generated as described above.

In yet other examples, the bridge service can be configured to monitor a transcript (whether live or otherwise) for keywords and/or instructional phrases. For example, the bridge service can be configured to, in real time, lemmatize, tokenize, and/or otherwise semantically normalize words spoken in a meeting such that instructions, decisions, or other important moments in the meeting can be captured in the summary document generated as described above. For example, in one construction, the bridge service can be configured to "listen" for trigger phrases of affirmation such as "I'll do that" or "that's on me." In response to identifying that a trigger phase has been spoken, the bridge service can note the time stamp of the trigger phrase (in some examples modified by a context buffer, such as 15 or 30 seconds in advance of the trigger phrase), identify the speaking user (e.g., based on active audio streams), in a summary document that "user 1 affirmed responsibility for X at 0:00."

These foregoing examples are not exhaustive. It may be appreciated, more generally and broadly, that a bridge service as described herein can be configured to aggregate or otherwise obtain any team-generated data associated with a particular meeting and generate a summary document from that aggregated date. In many embodiments, the summary document can be automatically added to a collaborative note taking application or service or a collaborative documentation service or any other suitable collaboration tool such as described herein.

In further examples the bridge service can include and/or can be communicably coupled to one or more classification engines, parsers, or analyzers. Each (along with equivalents thereof) can be configured to receive as input a team-generated content item and to provide as output one or more data items derived from that team-generated content item. For example, a classifier may be configured to label or otherwise classify a team-generated content item as a particular type (e.g. input type) selected from a set of input types. For example, a classifier as described herein may be configured to label a chat message of "sorry for joining late" as an ignorable team-generated content item.

Output of one or more classification engines, parser, or analyzers can further be included in a summary document, such as described above. For example, a bridge service can be coupled to a sentiment analyzer which may be configured to determine a sentiment of each speaker attending a meeting. In this example, a sentiment summary can be included by a bridge service in a summary document, such as described above. For example, the summary document may indicate that "Attendee 1 had a neutral sentiment during meeting 123" or "Attendee 3 expressed a negative sentiment at time 1:23 when discussing feature 456 of project A."

These foregoing examples are not exhaustive. It may be appreciated that a bridge service can obtain, analyze, and summarize team-generated content in any number of suitable ways by accessing any number of suitable API endpoints of a third-party meeting service, such as described herein.

For example, in some cases, a third-party meeting tool can implement a chat feature. In these examples, the bridge service can be configured to subscribe to user input events published by (or otherwise made available by) the third-party meeting tool via a particular API endpoint. The bridge service consumes each received user input event (e.g., each new chat message input by an attendee of a meeting into a chat window rendered to support the chat feature) to determine whether a user input (e.g., text content, multimedia content, links, and so on) associated with the user input event contains information that should be captured or contains information that should be ignored. More generally, the bridge service is configured to parse the user input event to extract information or data, which can include team-generated content, therefrom.

As noted above, data parsed/extracted from a user input event can inform other operations of the bridge service. For example, in some embodiments the bridge service may be configured to execute a regular expression configured, in turn, to detect the presence of a particular keyword in a string of text. In response to detecting that keyword, the bridge service can perform an action, such as selecting a particular collaboration tool (and/or a particular API endpoint of that tool) into which team-generated data should be added.

In addition, embodiments described herein relate to systems and methods for extending familiar user interaction schema(s) of a collaboration tool to a third-party meeting tool, such as a video conferencing platform. As a result of these architectures, users of the collaboration tool can interact directly with features of the third-party meeting tool in the same manner that those users would otherwise interact with the collaboration tool directly. In another phrasing, a user can interact with one or more features of the third-party meeting tool and, in response, one or more actions can be automatically performed by the bridge service, within, or to, a selected collaboration tool.

In one example, a team of software developers may leverage an issue tracking system to record and follow process of one or more projects. This team may become familiar with one or more shortcuts or other interaction schemas (e.g., keyword triggers, script triggers, and so on) provided by that issue tracking system. For example, the issue tracking system may be configured to automatically create a new issue record after detecting a particularly-formatted user input, such as user input including a particular keyword, hashtag, or token or symbol-delimited phrase. As one example, the user may input to a text input field of the issue tracking system the text string "/task @user need to update project documents." In this example, the issue tracking system can be configured to detect the slash-prefixed term "task" (e.g., via regular expression), the at-sign prefixed term "user" and the remaining text "need to update project document." With this information, the issue tracking system can create a new task, assigned to the identified user, with the title "Need to Update Project Documents."

In addition, the same team of software developers may leverage a collaborative documentation system to maintain documentation and share information. As with the issue tracking system referenced above, the team may become familiar with one or more shortcuts or other interaction schemas (e.g., keyword triggers, script triggers, and so on) provided by that collaborative documentation system. For example, like the issue tracking system, the collaborative documentation system may be configured to perform a specific action after detecting a particularly-formatted user input, such as user input including a particular keyword, hashtag, or token or symbol-delimited phrase.

As one example, the user may input to a text input field of the collaborative documentation system the text string "/project/feature/new title: email authentication content: this product authenticates users based on single sign-on, tied to the user's corporate email address." In this example, the collaborative documentation system can be configured to detect the slash-prefixed path "/project/feature/new" (e.g., via regular expression), the colon suffixed terms "title" and "content" and the remaining text delimited by the terms title and content. With this information, the collaborative documentation system can create a new page at the path, with the specified title and the specified content.

Following this same preceding example, for embodiments described herein, the bridge service can be configured to extend the interaction schemas described above from the issue tracking system and the collaborative documentation system to the third-party meeting tool. More particularly, the bridge service can be configured to obtain user input provided to a chat feature of the third-party meeting tool, and parse that user input to determine which collaboration tool the user intends to interact with, and thereafter provide the user's instruction to the appropriate tool.

For example, the foregoing referenced team of software developers may begin a meeting using a third-party videoconference tool. During the meeting, an attendee may recognize that a new issue should be created. In conventional systems, as noted above, attendees of the meeting are required to manually add information generated in the meeting into appropriate collaboration tools, a task which is often cumbersome (e.g., requiring context switching between the collaboration tool and the third-party tool) and/or attention-consuming for at least one meeting attendee.

For embodiments describe herein, however, the attendee that recognizes that a new issue should be created can simply input an instruction string into the chat feature of the videoconference, formatted in the same manner as would otherwise be input directly to the issue tracking system. For example, the attendee may chat into the third-party meeting tool's chat window the string: "/task @me isolate cause of PNG display bug." This string can be received as a user input event by a bridge service, as described herein.

The bridge service can parse the string (and/or user input event) and/or compare the string's format against a set of interaction schemas each associated with a particular collaboration tool. Once a match is found between the string and a particular interaction schema, the bridge service can select the associated collaboration tool and forward the attendee's command to that selected tool to perform the task intended by the attendee.

With reference to the preceding example, the bridge service may detect an "add task" flag associated with an issue tracking system based on the presence of the string "/task." In other words, presence of this flag indicates to the bridge service that the interaction schema referenced by the user belongs to or is associated with an issue tracking system. The new task can be assigned to the user who added the comment to the chat, based on the presence of the self-referential handle "@me." As with other examples provided here, the new task can be created with the title "Isolate Cause of PNG Display Bug."

In some examples, an interaction schema is validated by (and/or defined by) comparing a string input by a user (and/or extracted from team-generated content) against a regular expression. For example, an issue tracking system can be associated with a first set of regular expressions/interaction schemas, whereas a collaborative documentation system can be associated with a second set of regular expressions/interaction schemas. In many embodiments, the first set and the second set are disjoint. As a result of these constructions, the bridge service can compare user input against each interaction schema of the set(s) of interaction schemas to find a match. Once a match is found, the user input can be forwarded to the associated collaboration tool. In this manner, the third-party meeting tool's chat window's functionality is extended to support familiar user interaction schemas of multiple collaboration tools.

For example, in one embodiment, an interaction schema associated with a particular collaboration tool can be defined in a data structure. As one example, an interaction schema associated with adding a new issue record to an issue tracking system can be defined as follows:

{
"action": "new_issue",
"expression": "(?i)(/action)\s+(@ [a-z0-9_]{1,})\s+(.*?)$"
}

In this example, a first capture group is defined as beginning with a forward slash and the term "action." A second capture group follows the first capture group (by at least one whitespace character) and is defined as beginning with an at-sign followed by a word containing only alphanumeric characters and underscore characters. The third capture group follows the second capture group, and can contain any character until a newline character is detected. If a user input matches this regular expression, the bridge service can infer that the user input contains a "create new issue" command intended for the issue tracking system.

More specifically, the bridge service can infer that the attendee intends to create a new issue in the issue tracking system with a title or description based on the content of the third capture group, and, additionally, that the new issue should be assigned to the responsibility of a user identified by the handle defined by the second capture group. Based on this determination, the bridge service may either (1) select and provide input to a "create issue" API endpoint of the issue tracking system dedicated to creating new issues or (2) can provide the user input directly as user input to a text input field or text input API endpoint of the issue tracking system. In this manner, and as a result of this construction, the bridge service automatically (1) recognizes that free-form user input provided by a user to a third-party tool is intended as an instruction for a particular/specific collaboration system, and (2) automatically forwards that information (and/or generates an API request based on that information) to the identified collaboration tool, in this case, an issue tracking system.

As another example, an interaction schema associated with editing an existing issue record in an issue tracking system can be defined as follows:

{
"action": "edit_issue",
"expression": "(?i)/([0-9a-z]{1,}(/edit)\s+(@ [a-z0-9_]{1,})\s+(.*?)$"
}

In this example, similar to the preceding example, a first capture group is defined as beginning with a forward slash and containing only alphanumeric characters. A second capture group follows the first and is preceded by a forward slash and the term "edit." A third capture group follows the second capture group by at least one whitespace character and is defined as beginning with an at-sign followed by a word containing only alphanumeric characters and underscore characters. A fourth capture group follows the third capture group, and can contain any character until a newline character is detected. If a user input matches this regular expression, the bridge service can infer that the user input contains an "edit existing issue" command intended for the issue tracking system.

The issue to edit can be defined by or based on the content of the first capture group. As with the preceding example, the bridge service can infer that the attendee intends to edit an issue in the issue tracking system identified by the content of the first capture group, with a title or description based on the content of the fourth capture group, and, additionally, that the edited issue should be assigned to the responsibility of a user identified by the handle defined by the third capture group. Based on this determination, as with the preceding example, the bridge service may either (1) select and provide input to an "edit issue" API endpoint of the issue tracking system dedicated to editing existing issues or (2) can provide the user input directly as user input to a text input field or text input API endpoint of the issue tracking system. In this manner, and as a result of this construction, the bridge service automatically (1) recognizes that free-form user input provided by a user to a third-party tool is intended as an instruction for a particular/specific collaboration system, and (2) automatically forwards that information (and/or generates an API request based on that information) to the identified collaboration tool, in this case, again, an issue tracking system.

As noted above, however, different collaboration systems may (and do) implement different interaction schemas. For example, an interaction schema associated with adding a page in a collaborative documentation system can be defined as follows:

{
"action": "add_page",
"expression": "(?i)(/[/a-z0-9_]{1,})(/new)\s+(@ [a-z0-9_]{1,})\s+(.*?)$"
}

In this example, similar to the preceding example, a first capture group is defined as beginning with a forward slash and containing only alphanumeric or additional forward slash characters. A second capture group follows the first and is preceded by a forward slash and the term "new." A third capture group follows the second capture group by at least one whitespace character and is defined as beginning with an at-sign followed by a word containing only alphanumeric characters and underscore characters. A fourth capture group follows the third capture group, and can contain any character until a newline character is detected. If a user input matches this regular expression, the bridge service can infer that the user input contains an "new page" command intended for the collaborative documentation system. The new page can be located at the path defined by the first capture group.

As with the preceding example, the bridge service can infer that the attendee intends to add a page in the collaborative documentation system, with a title or description based on the content of the fourth capture group, and, additionally, that the new page should list a user identified by the handle defined by the third capture group as the creator of that page. Based on this determination, as with the preceding example, the bridge service may either (1) select and provide input to a "new page" API endpoint of the collaborative documentation system or (2) can provide the user input directly as user input to a text input field or text input API endpoint of the collaborative documentation system. In this manner, and as a result of this construction, the bridge service automatically (1) recognizes that free-form user input provided by a user to a third-party tool is intended as an instruction for a particular/specific collaboration system, and (2) automatically forwards that information (and/or generates an API request based on that information) to the identified collaboration tool, in this case, a collaborative documentation system.

These foregoing examples are not exhaustive. It may be appreciated, more generally and broadly, that bridge service as described herein can be configured to leverage application programming interfaces ("APIs") of third-party meeting tools and collaboration tools of a collaborative work environment to extend user interaction schemas of one or more collaboration tools to those third-party tools.

As a result, users of the third-party tool can interact with that third-party tool in the same manner as collaboration tools used by the team, thereby dramatically simplifying the process of adding information generated in a meeting to one or more collaboration tools. Simultaneously with extending interaction schemas of various collaboration tools for the benefit of meeting attendees, the bridge service is configured to, as noted above, collect team-generated content and meeting metadata in order to generate a summary document which, at the conclusion of a meeting can be automatically added to a collaborative documentation system.

In yet further embodiments, a bridge service as described herein can be configured to extract information from one or more collaboration tools and transmit that information back to a third-party meeting system, such as described above. For example, in one embodiment, a participant in a meeting may enter a command into a chat window of a videoconference directed to (and formatted according to) a particular collaboration tool. The bridge service, as noted above, can recognize this command and direct the command (and/or an object created in response to receiving the comment) to an appropriate target collaboration tool. In this example, however, the collaboration tool may provide a response that the bridge service, in turn, is configured to receive. In some cases, the bridge service may thereafter access an API endpoint of the meeting service to input the response from the collaboration tool into a portion of the third-party meeting tool.

For example, in one embodiment of the preceding example, a meeting participant enters into a chat (during a video conference), "/issue_tracking_system #ProgressReport EmailSystem." The bridge service can recognize the syntax (e.g., an interaction schema) used by the user as a command intended to be consumed by an issue tracking system. Thereafter, the bridge service forwards the user input to an issue tracking system. In response, the issue tracking system returns to the bridge service a progress report (e.g., a percentage of work complete) corresponding to a project named EmailSystem. Once the bridge service receives this response from the collaboration tool, the bridge service can add the status report into the chat of the third-party video service.

In this manner, it may be appreciate that generally and broadly, a bridge service as described herein can be leveraged in two directions—a first direction to collect information generated during a meeting facilitated by a third party system and in a second direction to provide information to participants of an ongoing meeting.

These foregoing and other embodiments are discussed below with reference to FIGS. 1-6 However, those skilled in the art will readily appreciate that the detailed description given herein with respect to these figures is for explanation only and should not be construed as limiting.

Figure 2A:
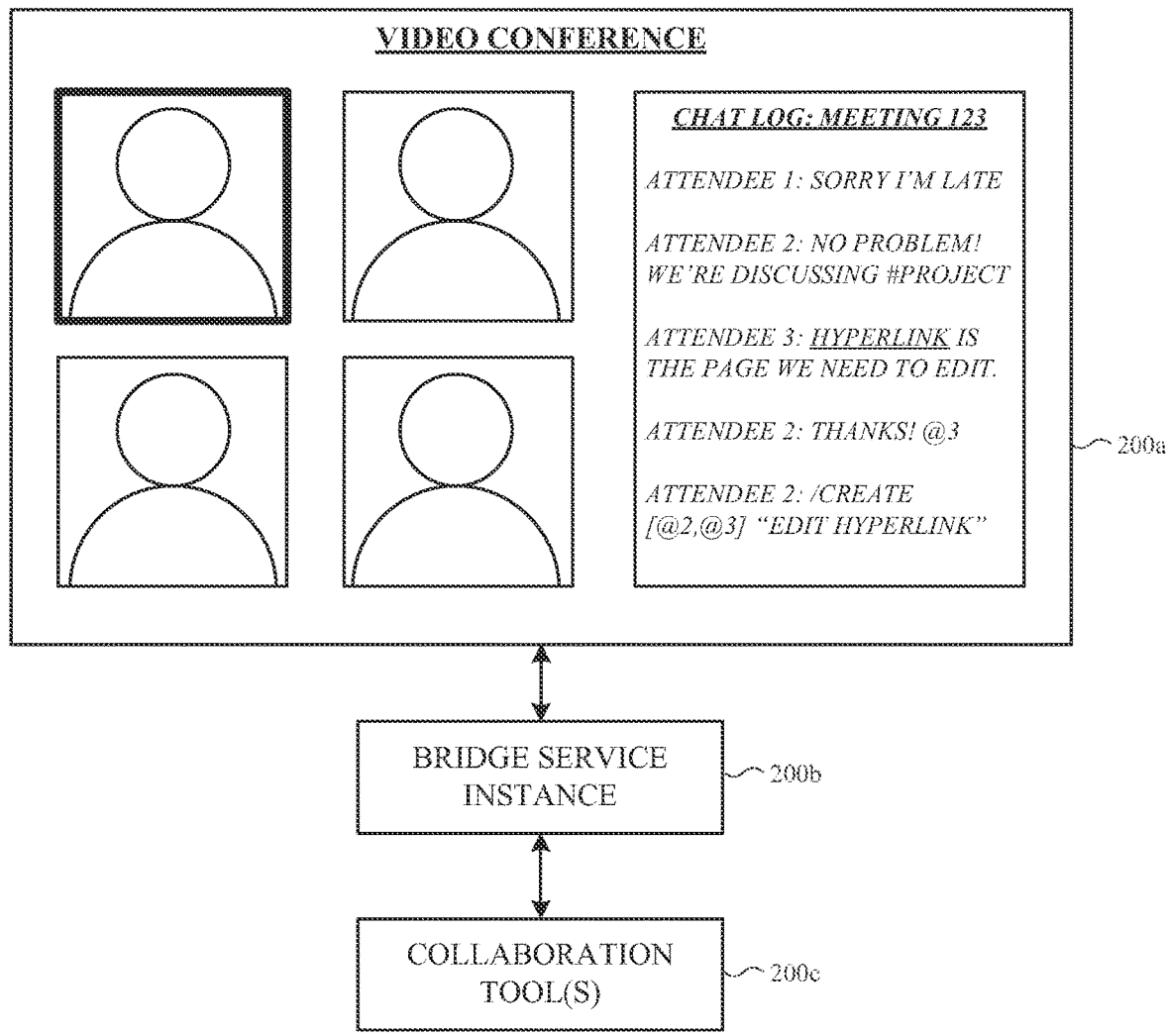
FIGS. 2A-2B depict a collaborative work environment, such as the collaborative work environment of FIG. 1, including a third-party meeting tool and one or more collaboration tools communicably coupled by an instance of a bridge service configured to communicably couple to API endpoints of both the third-party meeting tool and one or more collaboration tools, such as described herein.
Figure 2B:
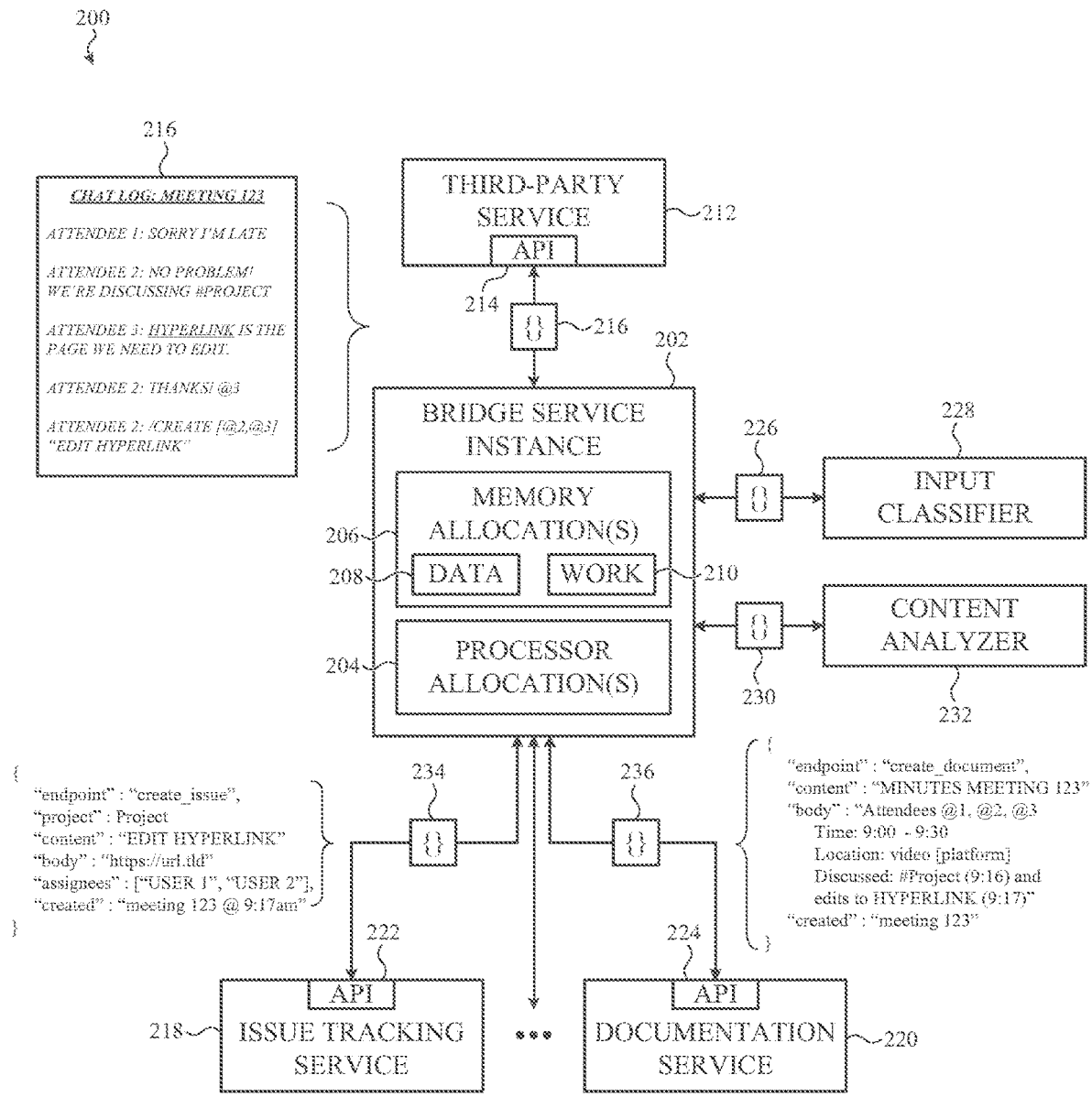

Generally and broadly, FIGS. 1 and 2A-2B depict simplified system diagrams of a collaborative work environment that may include one or more collaboration tools or collaboration services.

One example of a collaboration tool/software service, as described herein, is a project management system or tool that can be implemented in whole or in part as an instance or tenant of an instance of software executed by a container, a virtual server, or a physical server (or other computing appliance or combination of appliances) that provides a team of individuals with a means for communicating and exchanging information with one another. All information exchanged through and/or added to a project management system or tool can be considered team-generated content, as described herein.

In some examples, a collaboration tool can be configured for use by a software development team to exchange information that can facilitate the completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs"). Each data item associated with each above-described function can be considered team-generated content, as described herein.

In other cases, a collaboration tool can be configured for non-software related purposes, such as for use by a human resources team, an information technology support group, and so on. As with other examples introduced above, any configuration or addition of information to any collaboration tool described herein can be considered team-generated content, as described herein.

To perform these functions, a collaboration tool, however configured or used by a team of individuals or an organization, can implement a client-server architecture in which a host server or service associated with the collaboration tool receives requests from and provides responses to (some or all of which may comply with a communication protocol such as HTTP, TCP, UDP, and the like) one or more client devices, each of which may be operated by a user of the collaboration tool. In other cases, a request-response architecture may not be required and other communication and information transaction techniques may be used. For simplicity of description, examples that follow reference a request-response architecture, but it may be appreciated that different collaboration tools may be configured to serve and/or host information, including team-generated content, in a number of suitable ways.

In these examples, more specifically, a host server or server system supporting one or more functions of a collaboration tool such as described herein can serve information, including team-generated content, to a client device and, in response, the client device can render a graphical user interface on a display to present at least a portion of that team-generated content to a user of that client device. More specifically, a server system that includes a memory allocation and a processor allocation can instantiate an instance of a collaboration tool, as described herein. Once instantiated, the collaboration tool can be configured to receive API requests from a client device, from other collaboration tools, or from a bridge service as described herein.

More specifically, FIG. 1 depicts a collaborative work environment 100 that includes a bridge service 102, a third-party meeting tool 104, and a collaboration tool 106. Each of the bridge service 102, the third-party meeting tool 104, and the collaboration tool 106 can be configured to operate as an instance of software independently instantiated over a server system. In some cases, one or more of the bridge service 102, the third-party meeting tool 104, and the collaboration tool 106 may be instantiated over the same physical resources (e.g., memory, processor, and so on), whereas in other cases, each of the bridge service 102, the third-party meeting tool 104, and the collaboration tool 106 are instantiated over different, independent, and distinct physical hardware.

As the manner by which the bridge service 102, the third-party meeting tool 104, and the collaboration tool 106 are instantiated varies from embodiment to embodiment, FIG. 1 depicts each of the bridge service 102, the third-party meeting tool 104, and the collaboration tool 106 as supported by dedicated resource allocations. In particular, the bridge service 102 is supported by the resource allocation 102a, the third-party meeting tool 104 is supported by the resource allocation 104a, and the collaboration tool 106 is supported by the resource allocation 106a.

As with other embodiments described herein, the resource allocations supporting the bridge service 102, the third-party meeting tool 104, and the collaboration tool 106 can each include a processor allocation and a memory allocation. The processor and memory allocations may be static and/or may be scalable and dynamically resizable.

In many embodiments, the memory allocations of the bridge service 102, the third-party meeting tool 104, and the collaboration tool 106 include at least a data store or other data base and a working memory allocation.

As a result of these constructions, each of the bridge service 102, the third-party meeting tool 104, and the collaboration tool 106 can be instantiated in response to a respective processor allocation accessing from a respective data store at least one executable asset (e.g., compiled binary, executable code, other computer instructions, and so on). Thereafter, the processor allocation can load at least a portion of the executable asset into the respective working memory allocation in order to instantiate respective instances of the bridge service 102, the third-party meeting tool 104, and the collaboration tool 106.

Once each of the bridge service 102, the third-party meeting tool 104, and the collaboration tool 106 are instantiated, the bridge service 102 can be configured to communicably couple to the third-party meeting tool 104 and the collaboration tool 106.

More specifically as noted above, in many cases the bridge service 102 is configured to communicate with the third-party meeting tool 104 and the collaboration tool 106 according to a request/response architecture. This, however is not a required implementation. In other embodiments, a subscription/publication communication model may be implemented.

FIGS. 2A-2B depict a collaborative work environment, such as the collaborative work environment of FIG. 1, including a third-party meeting tool and one or more collaboration tools communicably coupled by an instance of a bridge service configured to communicably couple to API endpoints of both the third-party meeting tool and one or more collaboration tools, such as described herein.

FIG. 2A depicts the collaborative work environment 200 that includes, as one example, a third-party video conferencing platform 200a that is communicably coupled to a bridge service 200b which, in turn, is communicably coupled to one or more collaboration tools 200c. In some cases, the bridge service 200b is a plugin to the third-party video conferencing platform 200a (and executes over the same hardware thereof), whereas in other cases, the bridge service 200b executes over different and separate hardware. This general architecture facilitates various embodiments described herein in which team-generated content (including chat content, transcript content, file sharing, and others) produced or otherwise generated during a video conference facilitated by the third-party video conferencing platform 200a can be captured and aggregated by the bridge service 200b and, in turn, stored into one or more selected collaboration tools among the one or more collaboration tools 200c. In addition, as noted above, the bridge service 200b can obtain information from one or more collaboration tools 200c to input to a video conference, such as via a chat window of the third-party video conferencing platform 200a, as a video participant (e.g., by sharing a screen, providing text in a video stream, via audio in a video stream), and so on.

FIG. 2B depicts the collaborative work environment 200 in greater detail and includes a bridge service instance 202. As noted above, the bridge service instance 202 can be supported by an allocation of processing and memory resources. For example, the bridge service instance 202 can be executed over a processor allocation 204 and a memory allocation 206 that includes a data store 208 and a working memory 210. As with other example embodiments described herein, in order to instantiate the bridge service instance 202, the processor allocation 204 may be configured to access the data store 208 in order to load therefrom at least a portion of an executable asset into the working memory 210.

The bridge service instance 202, once instantiated, is configured to communicate with a third-party meeting service 212 via at least one API endpoint, identified in the figure as the API endpoint 214. As a result of this construction, the bridge service instance 202 can exchange structured data 216 (e.g., in the form of requests/responses) with the third-party messaging service 212.

The structured data 216 returned form the third-party meeting service 212 can include any suitable information about an ongoing meeting or a past meeting at least in part facilitated by the third-party meeting service 212. For example, in some embodiments, the structured data 216 can include a chat log (such as shown in FIG. 2). In other cases the structured data 216 can include other information generated by or stored by the third-party meeting service 212. Example information includes but is not limited to: team-generated content; meeting ID; date and time of meeting; invitee list; attendee list; transcript; video recording link; audio recording link; document list of documents exchanged or shared; current speaker; current users on mute; and so on. It may be appreciated by a person of skill in the art that any suitable data supported or served by the API endpoint 214 can be encapsulated in the structured data 216.

As noted with respect to other embodiments described herein, the bridge service instance 202 is configured to aggregate data about a meeting and data created during a meeting (and/or before or after) in order to (1) generate a summary document memorializing and summarizing the meeting and (2) extend one or more user interaction schemas defined by one or more collaboration tools.

As such, the bridge service instance 202 may also be communicably coupled to one or more collaboration tools. For example, the bridge service instance 202 may be coupled to an issue tracking service 218 and a documentation service 220.

As with the communications between the bridge service instance 202 and the third-party meeting service 212, the bridge service instance 202 communicates with each of the issue tracking service 218 and the documentation service 220 via tool-specific APIs.

For example, the bridge service instance 202 can be configured to leverage an API endpoint 222 to communicate with the issue tracking service 218 and an API endpoint 224 to communicate with the documentation service 220.

As noted above, the bridge service instance 202 may leverage the API endpoints 214, 222, and 224 to transit information created, generated, referenced, or otherwise associated with a meeting facilitated by the third-party meeting service 212 into one or more of the issue tracking service 218 or the documentation service 220.

In order to determine which collaboration tool should be the recipient of information (such as team-generated content) obtained from the third-party meeting service 212, the bridge service instance 202 is configured to provide input(s) or other data received from the third-party meeting service 212 as an input 226 to an input classifier 228. The input classifier 228 can be implemented in a number of suitable ways, one such example of which is a trained classifier. The input classifier 228 is configured to receive as input at least one data item obtained by the bridge service instance 202 from the third-party meeting service 212 via the API endpoint 214.

In some cases, the input classifier 228 may be leveraged by the bridge service instance 202 to determine whether or not to ignore certain content obtained from the third-party meeting service 212 via the API endpoint 214. For example, during a meeting, a user may enter into a chat window of the third-party meeting service a greeting to other users, or may offer a comment such as "great!" or "my internet connection is poor." The input classifier 228 may be trained and/or otherwise configured to determine whether such input should be ignored. Phrased in another non-limiting manner, the input classifier 228 may label such input as "Chatter" or "Ignored Content."

In other cases, the input classifier 228 may be configured to apply other labels to input based on the content of that input. For example, if a team-generated content item includes a string that references a project tracked by a project management system, the input classifier 228 may classify that input as a candidate for input to the identified project management system. Similarly, if a team-generated content item received by the bridge service instance 202 from the third-party meeting service 212 via the API endpoint 214 includes a phrase such as "bug" or "issue report" or similar, the input classifier 228 may classify/label that input as a candidate for input to an issue tracking system.

These foregoing examples are not exhaustive; it may be appreciated that an input classifier such as the input classifier 228 can be configured in any suitable manner to tag, label, or otherwise organize or classify inputs(s) received by the bridge service instance 202 from the third-party meeting service 212 via the API endpoint 214.

Regardless of configuration or construction, it may be appreciated that generally and broadly, the bridge service instance 202 can provide a team-generate content item as input 226 to the input classifier 228 and, in turn, can receive as output from the input classifier 228 a label or classification which can inform an operation or decision of the bridge service instance 202. In one example, the bridge service instance 202 merely uses output form the input classifier 228 to determine which collaboration tool to select to store a particular data item. In other cases, the bridge service instance 202 leverages the label to perform other operations, such as validation operations, data extraction operations, metadata calculation or generation operations and so on. Broadly, the bridge service instance 202 can leverage output form the input classifier 228 in any suitable manner.

In addition, in some embodiments, the bridge service instance 202 is configured to provide input 230 (which can include an output of the input classifier 228 and/or one or more team-generated content items) to a content analyzer 232. The content analyzer 232 can be configured to perform one or more of the following, without limitation: sentiment analysis; image content analysis; transcription services; data validation; tone analysis; statistical analysis; regular expression matching; regular expression context extraction; and so on. In many cases, an output provided by the content analyzer 232 can be leveraged by the bridge service instance 202 to select a particular API endpoint of a particular collaboration tool, such as described above.

In further embodiments, the bridge service instance 202 can leverage an output of the content analyzer 232 to recognize user of an interaction schema by an attendee of the meeting. For example, as described above, the content analyzer 232 can be configured to compare team-generated content or other data or metadata obtained by the bridge service instance 202 to one or more interaction schemas (e.g., by regular expression comparison, as one example) that, in turn, are associated with a respective one collaboration tool.

In view of the foregoing described and illustrated architecture, it may be appreciated that a bridge service instance, such as the bridge service instance 202 can be configured in a number of suitable ways to (1) extend to third-party meeting tools user interaction schemas familiar to users of collaboration tools and (2) to automatically aggregate and summarize team-generated content created, referenced, displayed, or otherwise relevant to a meeting facilitated by that third-party meeting tool or service.

More specifically, the bridge service instance 202 can analyze content (e.g., chat messages, links, documents shared, content of screen sharing, conversation, video content and so on) generated during a meeting and can inform one or more decisions based on that analysis. For example, the bridge service instance 202 can determine that a first content item corresponds to a request to create a new issue (an issue record) tracked by the issue tracking system 218. For example, the bridge service instance 202 may have detected that an attendee of the meeting said, "we should open a ticket for this data integrity bug; John can handle it" or an attendee of the meeting may have entered into a chat window of the third-party meeting service 212, "/new @john study data integrity bug."

In the first case, the bridge service instance 202 may identify, based on an output of the input classifier 228, that the statement "we should open a ticket" comprises an "Intent." In addition, the bridge service instance 202 may leverage an output of the content analyzer 232 to extract the phrases "new ticket," "data integrity bug" and the name "John" from the statement. With these phrases, the bridge service instance 202 can determine that the speaker, Jane, has assigned a new task to John with the title "Data Integrity Bug." This determination can be used to select the issue tracking service 218, select an API endpoint, such as the API endpoint 222, of the issue tracking service 218 specific to creating issues, and generate a request object 234 to provide as input to the issue tracking service.

In the second case, the bridge service instance 202 may identify based on an output of the content analyzer 232 that the message is formatted in a manner that matches an interaction schema associated with the issue tracking service 218. In this example, the bridge service instance 202 can either (1) forward the message directly to a text input API endpoint of the issue tracking service 218 or, (2) can further parse the message in order to create and/or generate the request object 234.

In another example, the bridge service instance 202 may be determine that a particular content item is intended to be memorialized in the documentation service 220, or another collaboration tool. In this example, as described above, the bridge service instance 202 can be configured to either (1) generate a request object 236 or (2) forward at least a portion of a received data item directly to the selected collaboration tool.

In view of the foregoing, it may be appreciated that a bridge service instance, such as the bridge service instance 202 can be configured in a number of ways to (1) automatically capture content exchanged and/or generated during a meeting and (2) facilitate easy access to one or more collaboration tools through the same user interface as used to conduct a meeting, namely, within an environment defined by a third-party meeting tool.

These foregoing embodiments depicted in FIGS. 1-2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, in some embodiments, a bridge service instance may be configured to parse information from a meeting invite prior to the start of that meeting. In certain constructions a graphical user interface can be presented to a meeting organizer that allows the meeting organizer to specify for a bridge service (and attendees of the meeting) specific connections or logical associations with one or more collaboration tools.

Figure 3:
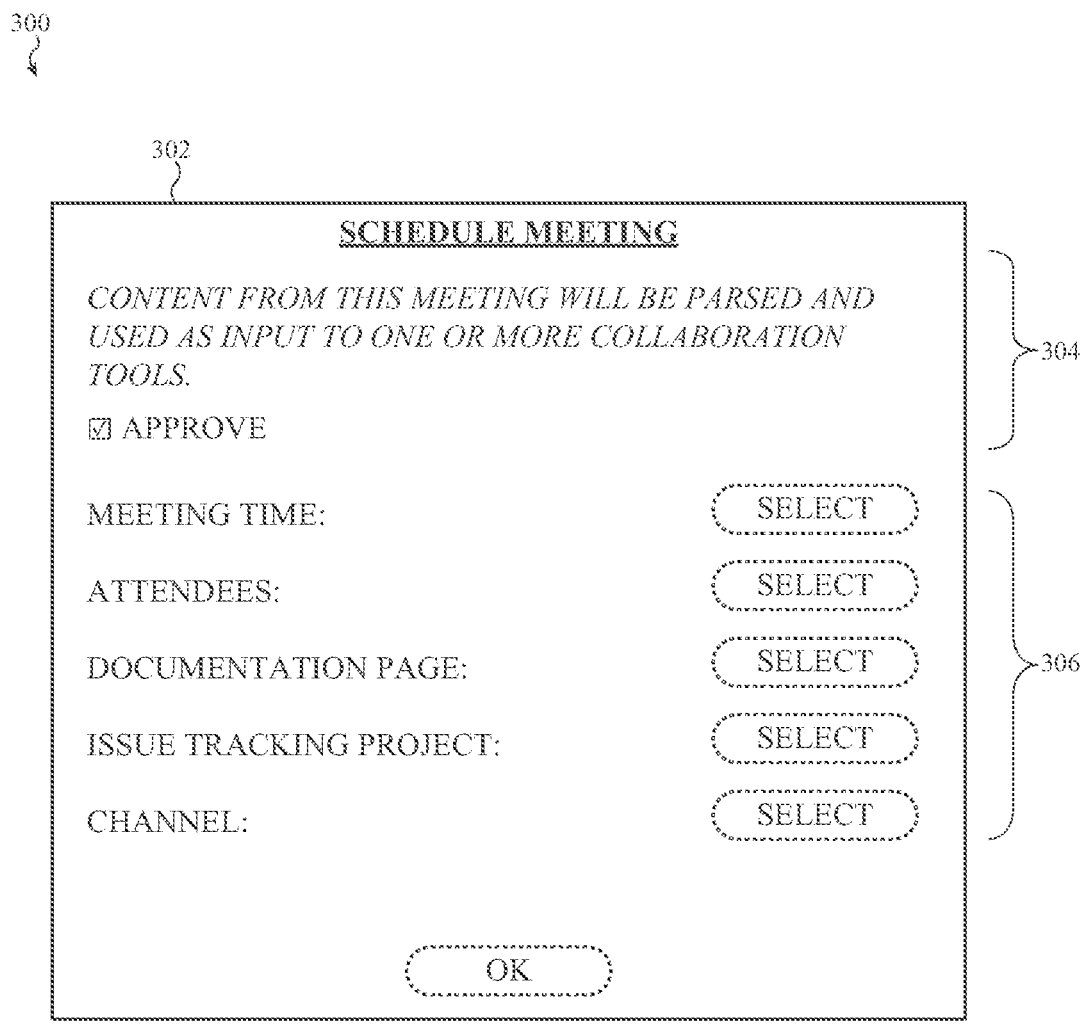
FIG. 3 depicts an active display area of a client device associated with a collaborative work environment, as described herein, rendering a graphical user interface defining one or more user interface elements that can be leveraged by a user to inform behavior of a bridge service, as described herein.

For example, FIG. 3 depicts an active display area 300 of a client device associated with a collaborative work environment, as described herein. The client device is depicted as rendering a graphical user interface 302 defining one or more user interface elements that can be leveraged by a user to inform behavior of a bridge service, as described herein.

In particular, the graphical user interface 302 depicts an interface that may be used by an organizer of a meeting to define a logical association between a meeting facilitated by a third-party meeting system and one or more collaboration tools, such as an issue tracking system and/or a documentation system.

For example, in the illustrated embodiment, the graphical user interface 302 includes a disclosure section 304 that informs the organizer and/or requests permission from the organizer to monitor team-generated content during a meeting in order to automatically generate meeting minutes (e.g., a document summary or summary document, such as described above). In this example, once the organizer affirms that the organizer agrees to operation of the bridge service as described herein, one or more additional options 306 may be presented for the organizer. These additional options enable the organizer to specify a logical association between a particular project (e.g., tracked by an issue tracking system) and/or a documentation page (e.g., maintained by a documentation system).

These options, as noted above, can be saved with a circulated meeting invite which, in turn, can be parsed and/or otherwise consumed by a bridge service as described herein.

It may be appreciated that the foregoing simplified example graphical user interface is merely one example means by which a system as described herein can incorporate more information into a meeting invitation to assist with functionality of a bridge service such as described herein.

For example, in some embodiments, different collaboration tools and/or components of collaboration tools (e.g., projects, pages, and so on) can be used.

Regardless of form or format of a graphical user interface presented to an organizer of a meeting, it may be appreciated that the data added to that invite is team-generated content, such as described herein and can therefore be consumed by a bridge service to (1) generate a summary document and/or (2) to extend one or more user interface interaction schemas associated with a collaboration tool to the third-party meeting tool.

FIG. 4 depicts an active display area 400 of a client device associated with a collaborative work environment, as described herein, rendering a graphical user interface 402 summarizing team-generated content produced during a meeting or event. More simply, the graphical user interface 402 depicted in FIG. 4 presents an example summary document that can be generated, automatically, by a bridge service as described herein.

The summary document shown in the graphical user interface 402 includes multiple sections, each of which contain data extracted from a team-generated content item associated with a particular meeting. For example, some data shown in the summary document may have been exchanged in a chat window during the meeting, some of the data may have been appended to an original meeting invite circulated to invitees, some of the data may have been a portion of an updated meeting invite circulated to invitees, some of the data may be extracted from a transcript of the meeting, and so on. It may be appreciated that, in view of the various embodiments described herein, any suitable team-generated content—regardless of form or format—can be parsed and included in a summary document such as shown in FIG. 4.

The summary document shown in the graphical user interface 402 includes a first section 404 that memorializes bibliographic information about a specific meeting, including a meeting title, a meeting ID, the date and time of the meeting, participants in the meeting, how various attendees joined the meeting and/or participated therein, and so on. It may be appreciated that these examples are not exhaustive; in other cases, other information can be included. Examples include, but are not limited to: invitees; attendees; meeting host; meeting presenters; and so on.

The summary document shown in the graphical user interface 402 also includes a second section 406 that memorializes records of the meeting itself. For example, the second section may include a link to a video recording of the meeting, an audio recording of the meeting, a transcript of the meeting, a chat log of the meeting, diagnostic logs generated during the meeting, other communication channels used by participants during the meeting, and so on. As with foregoing examples, it may be appreciated that these examples are not exhaustive; in other cases, other information can be included. Examples include, but are not limited to: transcript translations; languages spoken; number of speakers; percentage of time various speakers occupied; number/identity of participants who did not speak; and so on.

The summary document shown in the graphical user interface 402 also includes a third section 408 that includes and/or links to other actions taken by the bridge service during the meeting. This may include interactions between the bridge service and other collaboration tools (e.g., tasks assigned, issues added, documents created, and so on). This may also include physical document referenced and/or attached that were referenced in the meeting. This may also include documents reviewed during the meeting during a screen-sharing session. As with foregoing examples, it may be appreciated that these examples are not exhaustive; in other cases, other information can be included. Examples include, but are not limited to: speaker general meeting sentiment; speaker/attendee tone; similarity score of meeting with respect to previous meetings; suggestions to schedule a follow-up meeting; and so on.

These foregoing embodiments depicted in FIG. 3-4 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
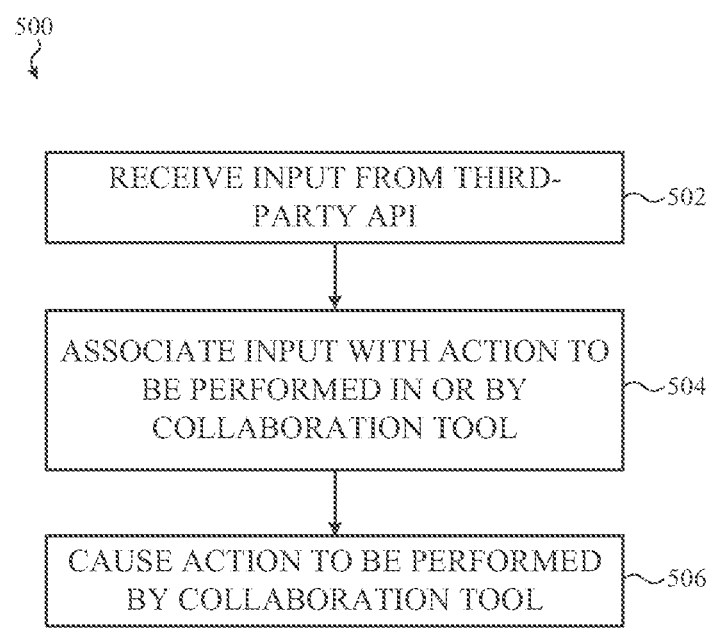
FIG. 5 is a flowchart depicting example operations of a method of operating a bridge service and/or one or more input classifiers or content analyzers, such as described herein.

FIG. 5 is a flowchart depicting example operations of a method of operating a bridge service and/or one or more input classifiers or content analyzers, such as described herein. The method 500, as with other methods described herein can be performed in whole or in part by a bridge service. More particularly, at least a portion of the method 500 can be performed by a processor allocation and/or a memory allocation associated with a server dedicated, at least in part, to execution of an instance of a bridge service as described above.

The method 500 includes operation 502 at which an input, input event, or other trigger is received from a third-party API endpoint. The input can be received in any form or format, at may be structured or unstructured. The input event typically includes at least one item, or metadata item, that constitutes team-generated content as described above.

The method 500 includes operation 504 at which the input received at operation 502 is associated with an action to be performed in or by a collaboration tool. More particularly, the input can be provided to an input classifier and/or a parser in order to determine whether the input is or contains (1) a team-generated content item that should be stored and/or summarized in a summary document generated by a bridge service as described above and/or (2) corresponds to an interaction schema of a collaboration tool. Thereafter, at operation 506 the bridge service causes the action associated with the input to be performed. More specifically, the bridge service either (1) appends the content item associated with the input to a summary document as described above or (2) provides the input event or content item as input to an associated collaboration tool.

Figure 6:
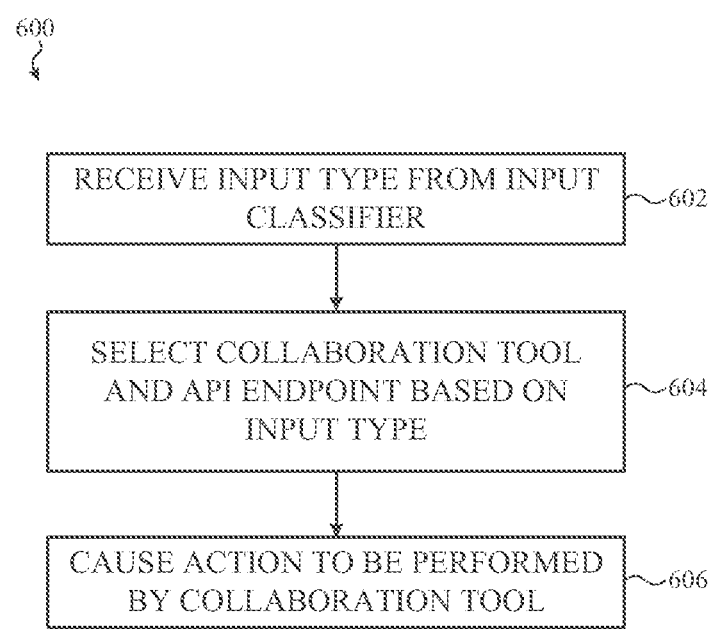
FIG. 6 is a flowchart depicting example operations of a method of operating a bridge service and/or one or more input classifiers or content analyzers, such as described herein.

FIG. 6 is a flowchart depicting example operations of a method of operating a bridge service and/or one or more input classifiers or content analyzers, such as described herein. As with method 500 of FIG. 5, the method 600 can be performed in whole or in part by a bridge service. More particularly, at least a portion of the method 600 can be performed by a processor allocation and/or a memory allocation associated with a server dedicated, at least in part, to execution of an instance of a bridge service as described above.

The method 600 includes operation 602 at which an input type is received from an input classifier, such as the input classifier referenced with respect to FIG. 2. Thereafter, at operation 604, a collaboration tool can be selected from a set of collaboration tools based on the input type. In addition (or alternatively) an API endpoint of the selected collaboration tool can likewise be selected based on the input type. Finally, at operation 606, an action can be performed, such as submitting a request object and/or other input to the selected API endpoint of the selected collaboration tool As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it may be appreciated that the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

What is claimed is:

1. A server system comprising:
 a memory allocation defined by:
  a data store storing an executable asset; and
  a working memory allocation;
 a processor allocation configured to load the executable asset from the data store into the working memory to instantiate an instance of a bridge service configured to:
  communicably couple to an application programming interface (API) endpoint of a third-party videoconferencing platform;
  communicably couple to a collaboration tool service;
  select, from the data store, a user interaction schema associated with the collaboration tool service;
  receive a user input event from the API endpoint of the third-party videoconferencing platform corresponding to a messaging feature of the third-party videoconferencing platform facilitating exchange of messages between participants of a video conference;
  extract a user input from the user input event;
  provide the user input as input to an input type classifier;
  receive as output from the input type classifier an input type;
  in response to determining that the input type is:
   an ignored input type, rejecting the user input; or
   a captured input type, validating the user input against the user interaction schema and in response to successful validation of the user input, generate an API request object comprising the user input and provide the API request object as input to the collaboration tool service.

2. The server system of claim 1, wherein the user input comprises one or more of:
 a text input;
 a multimedia input; or
 a uniform resource location.

3. The server system of claim 1, wherein:
 the collaboration tool service comprises an issue tracking service; and
 the API request object causes the issue tracking service to one or more of:
  create a new issue record comprising at least a portion of the user input; or
  update an existing issue record with at least a portion of the user input.

4. The server system of claim 3, wherein:
 the bridge service is configured to obtain a metadata object from the third-party videoconferencing platform; and
 the new issue record comprises at least a portion of the metadata object.

5. The server system of claim 4, wherein the metadata object comprises metadata of an event defined at least in part by the third-party videoconferencing platform during which the input event occurred.

6. The server system of claim 5, wherein the metadata comprises one of:
 a timestamp;
 an event title;
 an event description; or
 an event transcript.

7. The server system of claim 1, wherein the third-party videoconferencing platform is configured to execute, at least in part, over the processor allocation and the memory allocation.

8. The server system of claim 1, wherein:
 the third-party videoconferencing platform is a videoconferencing platform;
 the collaboration tool service comprises a documentation service; and
 the API request object causes the documentation service to one or more of:
  create a new page comprising at least a portion of the user input; or
  update an existing page with at least a portion of the user input.

9. A method of operating an instance of a bridge service configured to parse real-time data from a third-party meeting service as input to a collaboration tool selected from a set of collaboration tools, the method comprising:
 accessing, by the bridge service, a first application programming interface (API) endpoint of the third-party meeting service during a meeting event defined by the third-party meeting service;
 receiving an input event provided by an attendee of the meeting event from the first API endpoint;
 obtaining metadata of the meeting event from the third-party meeting service;
 providing the input event as input to an input classifier;
 receiving an input type as output from the input classifier;
 selecting a second API endpoint of the collaboration tool based on the input type; and
 generating an API request object comprising the user input, the input type, and the metadata of the event; and
 providing, by the bridge service, the API request object as input to the second API endpoint of the collaboration tool service.

10. The method of claim 9, wherein:
 the event is a videoconference meeting; and
 the metadata comprises at least one of:
  a meeting title of the videoconference meeting;
  an attendee of the videoconference meeting;
  an attendee list of the videoconference meeting;
  a description of the videoconference meeting; or
  a timestamp during the videoconference meeting.

11. The method of claim 9, wherein:
the event is a videoconference meeting; and
the input event comprises a text input to a chat field rendered in a user interface of the videoconference meeting.

12. The method of claim 11, wherein the text input comprises:
a uniform resource location; or
a link to a file.

13. The method of claim 11, wherein the text input comprises an instruction to the collaboration tool perform a task.

14. The method of claim 13, wherein:
the collaboration tool is an issue tracking system; and
the task is selected from:
creating a new issue report in the issue tracking system comprising at least the metadata; or
editing an issue record based on at least the metadata.

15. The method of claim 13, wherein:
the collaboration tool is a collaborative documentation system; and
the task comprises creating a new document in the collaborative documentation system.

16. The method of claim 9, wherein in response to determining that the input type should be ignored, discarding the input event.

17. A method of operating a bridge service instance to automatically memorialize information generated when operating a third-party meeting service, the method comprising:
accessing, by the bridge service, an application programming interface (API) endpoint of the third-party meeting service during an event defined by the third-party meeting service;
obtaining event metadata from the third-party meeting service;
monitoring, during the event, the API endpoint for user input;
on receiving a user input:
providing the user input as input to an input classifier to receive an input type;
selecting a collaboration tool from a set of collaboration tools based on the input type; and
providing, by the bridge service, the user input and the metadata as input to the selected collaboration tool.

18. The method of claim 17, wherein the set of collaboration tools comprises:
a documentation service;
an issue tracking service;
a code repository service; and
a messaging service.

19. The method of claim 17, wherein the event metadata comprising an event time and an event title.

20. The method of claim 17, wherein the input type is selected from a group consisting of:
an instruction input type; and
a keyword input type.

* * * * *